Oct. 2, 1962                    C. CARROLL                    3,056,480
                         SEALED RATCHET LEVER HOIST
Filed Aug. 7, 1958                                        4 Sheets-Sheet 1
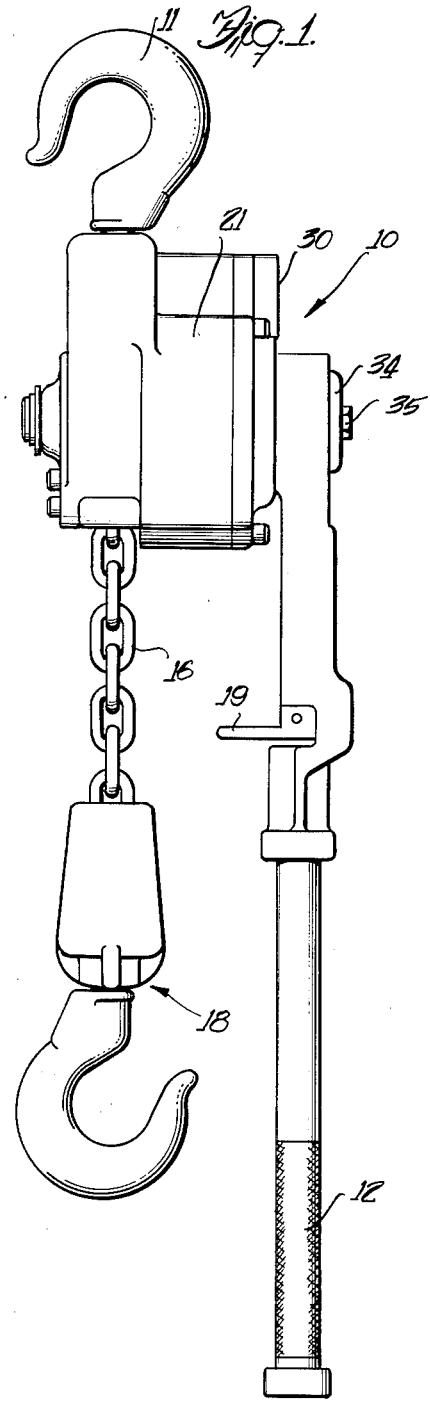
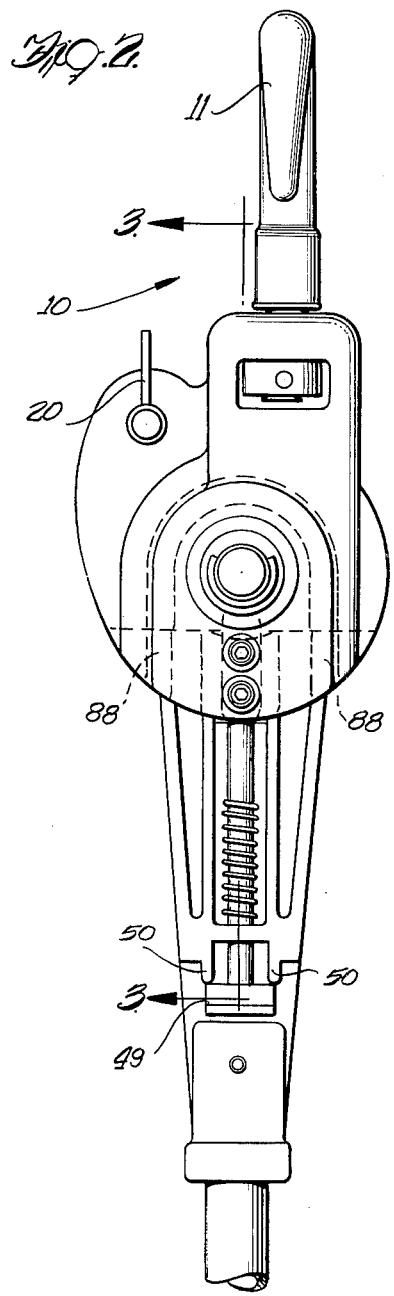
Inventor
Charles Carroll
Attorney Oct. 2, 1962

C. CARROLL 3,056,480

SEALED RATCHET LEVER HOIST

Filed Aug. 7, 1958

Inventor
Charles Carroll
Attorney

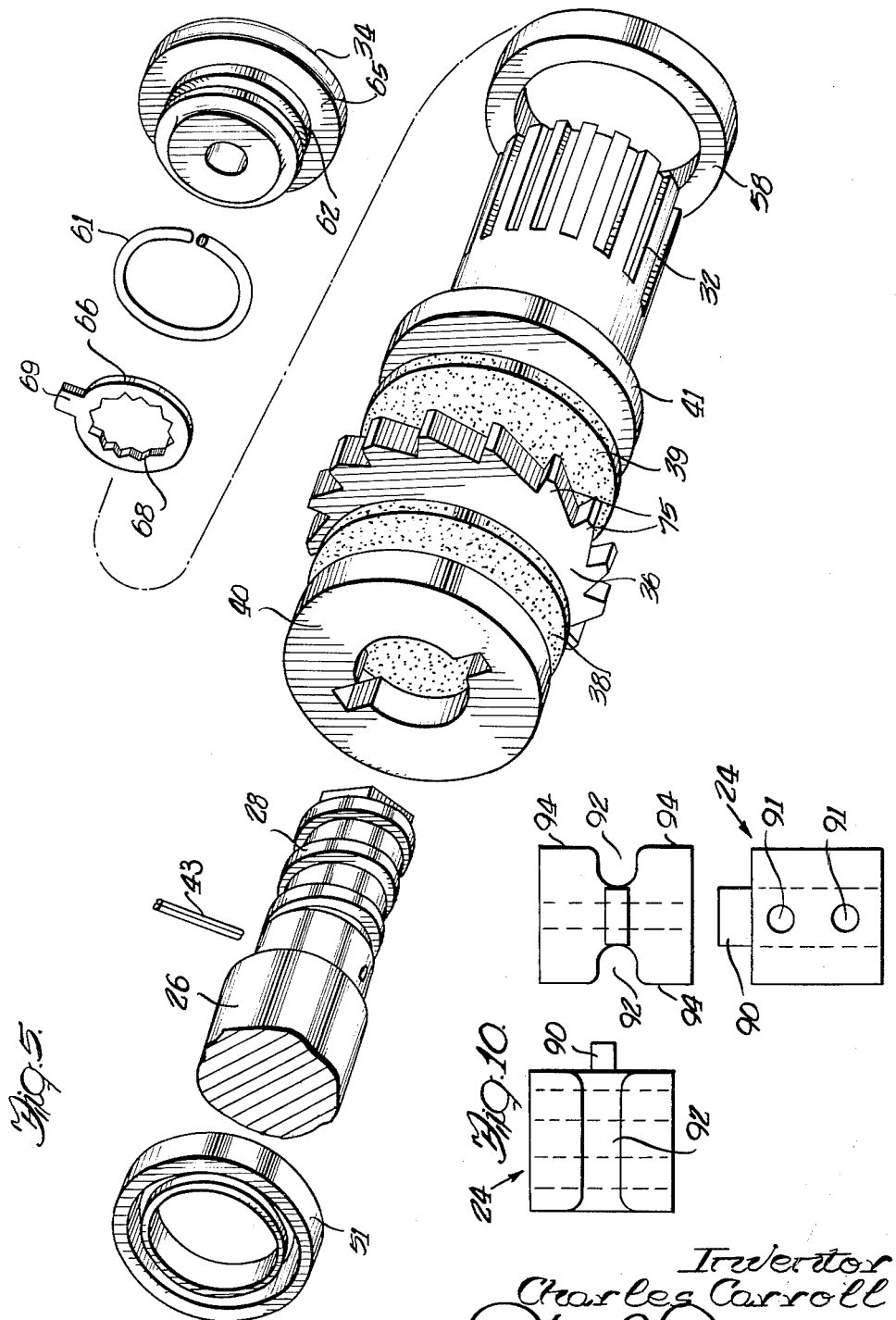

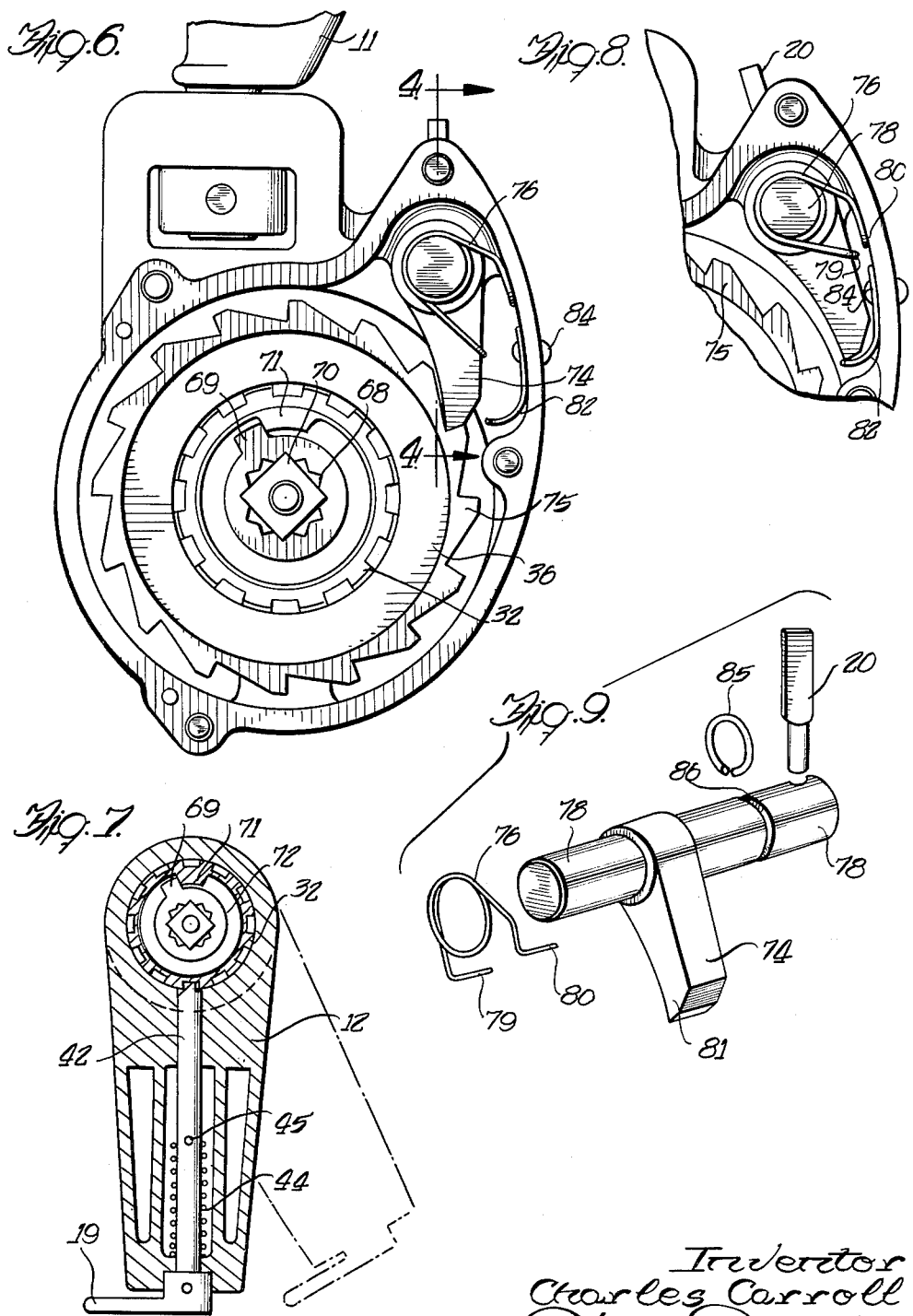

३,०५६,४८०
SEALED RATCHET LEVER HOIST
Charles Carroll, Danville, Ill., assignor to Duff-Norton Company, Pittsburgh, Pa.
Filed Aug. 7, 1958, Ser. No. 753,807
10 Claims. (Cl. 192—16)

The present invention relates generally to a ratchet lever hoist which has an infinite lowering increment, and more particularly, to such a hoist or puller which is completely sealed from water and the inroads of foreign matter.

Hoists, pullers or binders used for such work as logging, utilities, construction, industrial plant maintenance, or erection, and military service, are used under the widest conceivable variety of exposure conditions that can be detrimental to the correct functioning of friction brake hoists. This, of course, is particularly true in military applications.

In all hoists of this type, presently manufactured, a dry friction brake is used to hold or release the load. The friction brake, under favorable conditions, is an excellent mechanism but highly sensitive to any changes in the frictional characteristics of the load holding members brought about by the inadvertent or intentional introduction of foreign material into the brake enclosure.

Under severe weather conditions, water can seep into the hoist causing the brake to slip and the metallic brake components to rust and bind. This usually necessitates the replacement of parts which is time-consuming and costly. Chemical exposure can be highly adverse due to the rusting of all metallic members and deterioration of the load holding pawl spring to the point of failure. This can be dangerous as the hoist may drop a load. Exposure to oil, mud, sand, etc., can also develop similar hazards.

To remedy the foregoing, the present invention proposes as its principal object, a sealed friction brake hoist which may be either lubricant-packed or run dry.

Another and related object of the invention is to furnish a fully sealed ratchet lever friction brake hoist with a minimum of extra weight added as a result of the sealing, and with no sacrifice in strength, or safety, in operation.

Still another object of the invention is to furnish a friction brake sealed hoist of the ratchet lever variety which permits incremental adjustment for brake wear without complete disassembly in the field.

Still another object of the invention is to provide a completely sealed hoist with infinite increments of lowering or load release.

A further object of the invention looks to the provision of a sealed hoist which can be oil or grease-packed, and can actually be submerged in water for as long as 72 hours, placed in a freezing atmosphere and will operate safely and efficiently.

Further objects and advantages of the present invention will become apparent as the following description of an illustrative embodiment proceeds, taken in conjunction with the accompanying drawings in which:

FIGURE 1 shows the illustrative ratchet lever friction brake-sealed hoist in front elevation.

FIG. 2 is an enlarged, partially broken, end view of the hoist shown in FIGURE 1.

FIG. 5 is an enlarged, exploded, partially broken view of the internal drive mechanism of the subject hoist showing the relationship of the component parts.

FIG. 6 is an enlarged, transverse section taken along section line 6—6 of FIG. 3.

FIG. 7 is a reduced, sectional view, taken along section line 7—7 of FIG. 3.

FIG. 8 is an enlarged, partially broken view of the free-chain mechanism shown in FIG. 6, illustrating the locking pawl in the free-chain position.

FIG. 9 is an enlarged, exploded, view of the principal components of the free-chain mechanism.

FIG. 10 is a composite front, side, and top view of the lead-in block.

Figure 3:
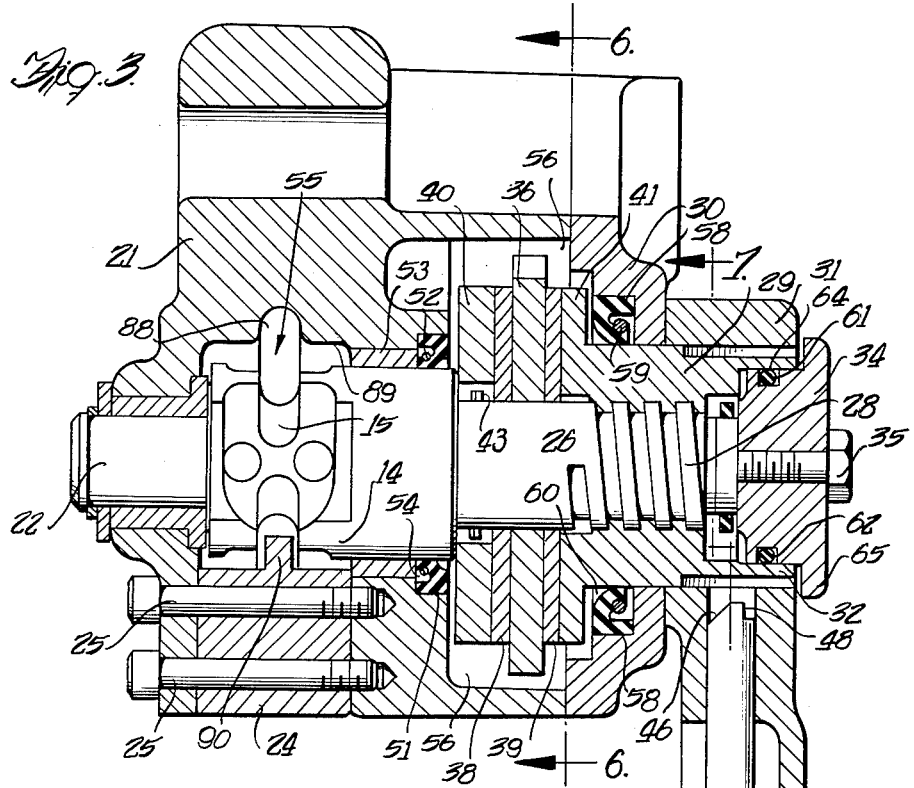
FIG. 3 is an enlarged, partial section taken along section line 3—3 of FIG. 2.

Although the invention is adaptable to a wide variety of hoist configurations, the one illustrated serves well to permit an understanding of the invention. Referring now to FIGS. 1 and 2, it will be seen that the illustrative friction brake ratchet lever hoist is of the manually-operated variety suspended by a support hook 11 and powered by a manually actuated handle 12. A sprocket 14 (see FIG. 3) is provided with pockets 15 in order to raise or lower link or roller-type chain 16. A swiveled work-engaging hook 18 is secured at one end of the chain 16, but it is contemplated that several types of work-engaging members may be employed.

In operation, the support hook 11 is attached to an eye, bar, or other solid point, and the work-engaging hook 18 attached to the work. The operator then sets the selector handle 19 to the up, down, or neutral position. Then by pumping the handle 12 back and forth, the hook 18 is either raised or lowered according to the position of the selector handle 19. In the event that the hook 18 is to be moved a substantial distance in order to engage the load, the free-chain handle 20 (see FIG. 2) is moved to the free-chain position, which in effect places the mechanism in "free wheeling" and permits the operator to move the hook 18 to any preselected position. Thereafter, the free-chain handle 20 is placed to the off position, and the handle 12 and selector handle 19 coordinated in accordance with the work to be done.

Referring now to FIG. 3, it will be seen that the housing shown contemplates several elements. The main body housing 21 is provided with a hollow central portion to accommodate the sprocket 14 and the journaled portion 22 of the sprocket drive shaft. A chain lead-in and stripper block 24 is secured in position by means of the mounting studs 25. The housing is completed by the attachment of end plate 30.

The sprocket drive shaft driven portion 26 has a threaded end 28 which engages the drive nut 29. The drive nut 29 is journaled for radial and axial travel within the housing end plate 30. The upper portion of the handle 12 has a collar 31 which rotates with respect to the axially keyed or splined end 32 of the drive nut 29 (see FIGS. 6 and 7). An end cap 34 is secured by means of an end cap bolt 35 to the threaded end 28 of the sprocket drive shaft and serves to hold the handle in place on the drive nut 29, as well as to implement the sealed construction, as will be detailed hereinafter.

A ratchet wheel 36 is journaled on the sprocket drive shaft driven portion 26 and is flanked by friction disks 38, 39. The friction disks 38, 39 mutually engage the ratchet wheel 36 and respectively the back brake pressure disk 40 and the front brake pressure disk shoulder 41 of the drive nut 29. The back brake pressure disk 40 is provided with a double key pin 43 which serves as a safety for the hoist. The details of the locking pawl will be described hereinafter in connection with the free-chain mechanism which is an integral part thereof.

As pointed out above, the sprocket 14 is ultimately driven by a reciprocating manual actuation of the handle 12. Within the handle 12 is an elongate drive pawl 42 which is urged, by coaxial spring 44, through the pin 45, in an upward direction. The upper end of the pawl 42 presents an inclined slip face 46 and an engaging shoulder 48. The inclined slip face 46 and engaging shoulder 48 are proportioned to lockingly engage the axial keyways 32 on the end of the drive shaft when moved in one direction, and over-run the keyways when moved in the other direction. The position in which the handle is shown in FIGS. 2 and 3 is the neutral position in which the selector handle attachment collar 49 abuts the shoulders 50, thereby freeing the free end of the pawl 42 from any possible contact with the axial keyways 32. Upon rotating the selector handle 19 ninety degrees in one direction or the other, the collar 49 falls between the two shoulders 50 and permits the upper end of the pawl 42 to over-runningly engage the axial keyways 32 in one direction, and positively engage them in the other, or vice versa. The reciprocating movement of the handle 12 is diagrammatically indicated in FIG. 7.

It will be readily understood in view of the foregoing, that the principal critical moving parts are a rotatable assembly including the drive nut, drive shaft, friction brake, and ratchet. To completely and effectively seal these parts within the housing against water leakage and the like, a pair of seals are located to flank the friction brake and ratchet assembly. The sprocket seal 51 illustrated is of the spring ring neoprene type, being positioned with the ring 52 oriented toward the sprocket 14. A suitable sprocket seal recess 54 is located in the main body housing 21 to accommodate the sprocket seal 51 ahead of the bushing 53. Thus, the bushing 53 serves to prevent the bulk of the foreign matter which might collect in the chainway 55, from entering the brake ratchet chamber 56. What moisture may migrate through the interface between the bushing 53 and the sprocket 14, is effectively sealed by the action of the sprocket seal 51.

A drive nut seal 58, having an inner spring 59, is provided along the drive nut peripherally in a recess 60 in the housing end plate 30. The drive nut seal 58 is closely adjacent the front brake pressure disk shoulder 41 of the drive nut 29, and oriented with the spring 59 facing the end cap 34. The drive nut seal 58 effectively prevents moisture from entering the brake-ratchet chamber 56 which may enter through the axial keyways 32 in the end of the drive shaft. Thus, the sprocket seal and drive nut seals, together, flank the brake-ratchet chamber, thereby insuring the chamber against the entry of moisture through the sprocket or the upper portion of the drive shaft.

The end cap 34 is provided with an end cap seal 61, shown as an O-ring 61 fitted in the O-ring groove 62 on the end cap 34. This O-ring 61 sealingly engages the cylindrical inner face 64 provided at the end of the threaded portion of the drive nut 29. The end cap locking shoulder 65 serves to prevent the handle collar 31 from moving off the keyed end of the drive shaft and simultaneously with the end cap seal 61, prevents moisture from entering the threaded area between the threaded end of the drive shaft 28 and the internal threads of the drive nut 29. Although the end cap seal has been shown as an O-ring 61, a spring ring seal of the character employed as sprocket seal 51 and drive nut seal 58, may be substituted, and also seals other than the spring-ring variety illustrated, but the equivalent thereof, are contemplated at the three seal locations.

Since entry to the critical brake chamber 56 is provided only along the drive shaft from the sprocket, along the drive nut from the handle, and through the threads of the drive shaft and drive nut, these three seals in the locations described effectively seal the critical working elements of the hoist from the decapacitating effects of moisture, dirt, and other contaminants. In addition, the same seals may serve to permit packing the entire brake-ratchet chamber 56 with a factory installed lubricant.

Adjustably to compensate for the frictional wear of the friction brake disks 38, 39, a thread stop washer 66 having a plurality of internal notches 68 and a peripheral stop 69 is slipped over the squared end 70 of the drive shaft. It will be appreciated that the position of the stop 69 with relation to the squared end 70 of the drive shaft may be varied by changing the engagement of the squared end 70 with the internal notches 68 of the thread stop washer. Absent this washer, the drive nut may become jammed in its extreme working positions. The peripheral stop 69 engages an internal thread stop boss 70 provided axially within the thread stop cylindrical chamber 72. By providing twelve notches 68 in the thread stop washer 66, adjustments in the order of thirty degrees can be made. The combination of the thread stop washer with its plurality of notches 68 and the squared end 70 of the drive shaft reduce the manufacturing cost of the adjustment feature, and yet permit a maximum degree of flexibility.

The free-chain mechanism is an integral part of the ratchet wheel locking pawl 74. The locking pawl 74, as illustrated in FIG. 6, engages the teeth 75 of the ratchet wheel 36 to prevent the load from backing the sprocket 14 when the pawl is in its normal position as shown in FIG. 6. Lock pawl spring 76 is provided to wrap around the locking pawl shaft 78 and presents a pawl engaging prong 79 and a housing abutment prong 80. As illustrated in FIG. 6, the spring 76 normally urges the pawl 74 into engagement with the ratchet wheel 36.

To disengage the locking pawl 74 in the event the operator wants to free-chain, the free-chain handle 20 is pressed, thereby rotating the locking pawl shaft 78 and depressing the pawl end 81 into a J-shaped retaining spring 82 secured within the housing by means of the rivet 84, or other suitable anchoring device.

Figure 4:
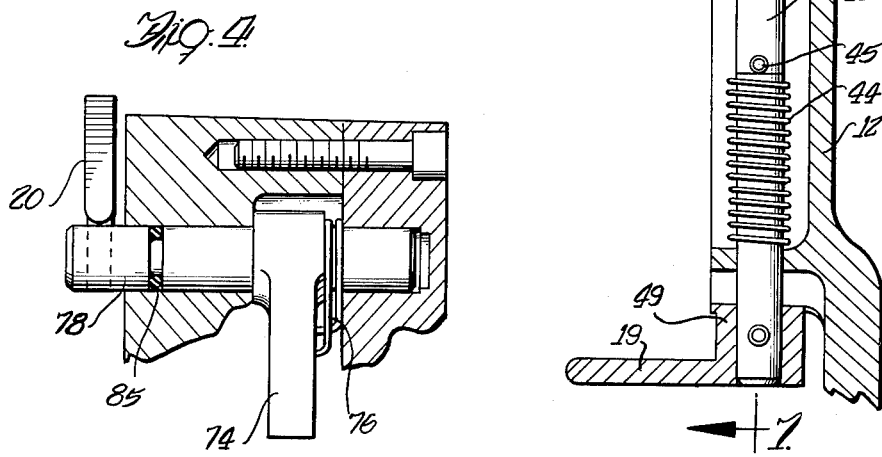
FIG. 4 is an enlarged, partially broken sectional view illustrating the free-chain mechanism, taken along section 4—4 of FIG. 6.

Since the locking pawl drive shaft 78 and handle 20 must extend outside the housing, an O-ring 85 is provided in a suitable ring groove 86 on the locking pawl drive shaft 78. This locking pawl O-ring, as shown in FIG. 4, provides an effective seal along the shaft 78. The opposite end of the shaft 78 extends into a dead end recess in the housing.

In consonance with one of the basic objects of the present invention to provide a maximum of safety both to the operator as well as the load, the subject hoist is provided with a slotted lead-in and stripper. FIG. 2 illustrates in dotted lines the peripheral chain channel 88 in the housing which envelops the sprocket 14. The relationship between the chain channel 88 and the sprocket 14 is also illustrated in FIG. 3. In addition, the cross-link shoulder 89 engages the cross-link to secure the chain to the sprocket 14 at the upper portion of its curved path over the sprocket 14.

A lead-in and stripper block 24, as shown in FIG. 3 is inserted beneath the chain sprocket 14 and secured in place by means of the bolts 25. Referring now to FIG. 10, it will be seen that the lead-in and stripper block 24 is provided with a cleaning projection 90. The cleaning projection 90 extends into the peripheral slots in the sprocket 14 in order to pick up and remove foreign matter which may become impacted in the recesses in the sprocket 14. A pair of bolt holes 91 traverses the stripper block and accommodates the mounting bolts 25. A pair of parallel and opposed chain slots 92 appear vertically in the ends of the block 24. The slots 92 are opposite the chain channel slots 88 in the housing when the stripper block is mounted in place. The cross-link shoulders 94 are proportioned to provide a cross-link channel in the opening at the bottom of the hoist, with the result that a pair of cross-like openings are presented in the bottom of the hoist through which the chain 16 feeds in and strips out.

It will be readily understood when the operator inadvertently lowers the load, that his thumb, or hand, could be drawn into the hoist as he steadies the load by gripping the chain just below the body of the hoist. With a slotted chain lead-in such as described above, this danger is removed, and in addition, provision is made for cleaning the chain before it enters the housing.

In review, it will be readily appreciated that a hoist or puller has been described which can deliver an infinite degree of lowering or load release in operation, and which can be free-chained, which is effectively sealed from moisture contamination of the critical working elements. The hoist is susceptible of manufacture with a lightweight, safe, and yet economical construction. It can be readily disassembled and adjusted in the field with an irreducible minimum of potential contamination during the adjustment. As pointed out above, a prototype hoist has survived a 72-hour immersion in water, far in excess of normal all-weather requirements.

Although particular embodiments of the invention have been shown and described in full here, there is no intention to thereby limit the invention to the details of such embodiments. On the contrary, the intention is to cover all modifications, alternative embodiments, usages and equivalents of the sealed ratchet lever hoist as fall within the spirit and scope of the invention, specification, and appended claims.

I claim as my invention:

1. A sealed ratchet friction brake hoist comprising, in combination, a housing, said housing defining a ratchet-brake inner chamber; a rotatable assembly, including a drive shaft, journaled in the housing and passing through said chamber; seals on the rotatable assembly seated in the housing flanking the ratchet-brake inner chamber; a handle; an end cap secured to the drive shaft to anchor the handle for rotation on the drive shaft; and seal means on the end cap sealing the drive shaft from the exterior of the hoist.

2. A sealed ratchet friction brake hoist comprising, in combination, a housing, a drive shaft journaled within the housing, a thread on one end of the drive shaft, a sprocket adjacent the other end of the drive shaft, friction brake means on the central portion of the drive shaft, a friction brake chamber defined in a mid-portion of the housing, a drive nut threaded to the drive shaft in abutting relationship with the friction brake means, said drive nut being journaled in the housing, opposed seals one at each end of the friction brake chamber respectively bearing against the housing and the drive shaft and drive nut, means for rotating the drive shaft, a cap on the drive nut, and a seal between the cap and drive nut sealing the threaded interface from the exterior.

3. A sealed ratchet friction brake hoist comprising, in combination, a housing, a drive shaft journaled within the housing, a thread on one end of the drive shaft, a sprocket adjacent the other end of the drive shaft, friction brake means on the central portion of the drive shaft, a friction brake chamber defined in a mid-portion of the housing, a drive nut threaded to the drive shaft in abutting relationship with the friction brake means, said drive nut being journaled in the housing, opposed seals one at each end of the friction brake chamber bearing respectively against the housing and the drive shaft and drive nut, means for rotating the drive shaft, a recess in the drive nut, a cap on the drive nut, said cap having a body portion to fit within the drive nut recess, and a seal between the cap and drive nut sealing the threaded interface from the exterior of the hoist.

4. A sealed ratchet friction brake hoist comprising, in combination, a housing, a drive shaft journaled within the housing, a thread on one end of the drive shaft, a sprocket adjacent the other end of the drive shaft, friction brake means on the central portion of the drive shaft, a friction brake chamber defined at a mid-point of the housing, a drive nut threaded to the drive shaft, said drive nut having a brake pressure disk shoulder at one end and a recess in its other end, said drive nut being journaled in the housing, opposed seals one at each end of the friction brake chamber bearing respectively against the housing and the drive shaft and drive nut, means for rotating the drive shaft, a cap on the drive nut, said cap having a body portion which nests within the drive nut recess, and a seal between the cap body and drive nut recess sealing the threaded interface from the exterior.

5. A sealed ratchet hoist comprising, in combination, a longitudinal central drive shaft, a housing, journal means in the housing supporting the drive shaft for rotation, a sprocket adjacent one end of the drive shaft, a thread adjacent the other end of the drive shaft, a drive nut having a brake pressure disk at its end, the drive nut being threaded to the drive shaft with the brake pressure disk facing the center of the drive shaft at the central portion thereof abutting the brake pressure disk of the drive nut, an inner seal on the drive shaft on the sprocket-side of the friction disk-pawl and ratchet assembly, an outer seal on the thread nut adjacent the brake pressure disk, seats in the housing to receive both of said seals, handle driving means on the drive nut for selectively rotating the driving nut clockwise or counterclockwise, a recess in the other end of the drive nut, a sealing cap having a body portion to mate with the drive nut recess, a shoulder at the outer end of the sealing cap to retain the handle drive means on the drive shaft, means for removably securing the sealing cap to the drive shaft, and a seal between the cap and the drive nut recess.

6. A sealed ratchet hoist comprising, in combination, a longitudinal central drive shaft, a housing, journal means in the housing supporting the drive shaft for rotation, a sprocket adjacent one end of the drive shaft, a thread adjacent the other end of the drive shaft, a drive nut having a brake pressure disk at its end, the drive nut being threaded to the drive shaft with the brake pressure disk facing the center of the drive shaft, a friction disk-pawl and ratchet assembly on the drive shaft at the central portion thereof abutting the brake pressure disk of the drive nut, an inner seal on the drive shaft on the sprocket-side of the friction disk-pawl and ratchet assembly, an outer seal on the thread nut adjacent the brake pressure disk, seats in the housing to receive both of said seals, handle driving means on the drive nut for selectively rotating the driving nut clockwise or counterclockwise, a cylindrical recess in the outer end of the drive nut, a sealing cap having a cylindrical body portion to mate with the drive nut cylindrical recess, a shoulder at the outer end of the sealing cap to retain the handle drive means on the drive shaft, means for removably securing the sealing cap to the drive shaft, and a seal between the cap body and the cylindrical recess in the drive nut thereby, with the inner and outer seals, sealing the friction brake means within the housing.

7. A sealed ratchet hoist comprising, in combination, a longitudinal central drive shaft, a housing, journal means in the housing supporting the drive shaft for rotation, a sprocket adjacent one end of the drive shaft, a thread adjacent the other end of the drive shaft, a drive nut having a brake pressure disk at its end, the drive nut being threaded to the drive shaft with the brake pressure disk facing the center of the drive shaft, a friction disk-pawl and ratchet assembly on the drive shaft at the central portion thereof abutting the brake pressure disk of the drive nut, an inner spring ring seal on the drive shaft on the sprocket-side of the friction disk-pawl and ratchet assembly, an outer spring ring seal on the thread nut adjacent the brake pressure disk, seats in the housing to receive both of said spring ring seals, handle driving means on the drive nut for selectively rotating the driving nut clockwise or counterclockwise, a cylindrical recess in the outer end of the drive nut, a sealing cap having a cylindrical body portion to mate with the drive nut cylindrical recess, a shoulder at the outer end of the sealing cap to retain the handle drive means on the drive shaft, means for removably securing the sealing cap to the drive shaft, and a seal between the cap body and the cylindrical recess in the drive nut thereby, with the spring ring seals, sealing the friction brake means within the housing.

8. A sealed ratchet friction brake hoist comprising in combination a housing having walls defining interiorly thereof a ratchet friction brake chamber; means for rotation relative to said housing, drive means rotatably supported in said housing and extending through said chamber and through said walls on opposed sides of said chamber and defining flowpaths where rotatably supported; and non-metallic means for sealing against fluid flow from outside of said housing to inside said chamber along the flow paths between the first said means and said housing walls.

9. A hoist according to claim 8 wherein the first said means comprises a shaft having a drive nut threaded thereon, said drive nut being at least partially within said chamber, an end cap for securing said drive nut on said shaft; and further including means for maintaining a continuous non-metallic seal between said drive nut and said end cap by frictionally and in fluid tight engagement sealing against mutually peripheral portions thereof thereby preventing fluid flow between the same and into the threaded joint between said shaft and said drive nut.

10. A sealed ratchet friction brake hoist comprising, in combination, a housing, said housing defining a ratchet-brake inner chamber; a drive shaft having a drive nut threaded thereon, said drive shaft being journaled within the housing and passing through the chamber; a handle; an end cap secured to the drive shaft to secure the handle for rotation on the drive shaft; and means for maintaining a continuous non-metallic seal between the end cap and the drive nut.

References Cited in the file of this patent
UNITED STATES PATENTS

| | | |
|---|---|---|
| 2,243,361 | Stahl | May 27, 1941 |
| 2,310,135 | Van Cleave | Feb. 2, 1943 |
| 2,687,196 | Camp | Aug. 24, 1954 |
| 2,736,408 | Coffing | Feb. 28, 1956 |
| 2,760,615 | Kerschner | Aug. 28, 1956 |
| 2,808,915 | Wilson | Oct. 8, 1957 |
| 2,848,083 | Wilson | Aug. 19, 1958 |
| 2,894,610 | Harrington | July 14, 1959 |
| 2,905,292 | Bretz | Sept. 22, 1959 |

FOREIGN PATENTS

| | | |
|---|---|---|
| 795,659 | Great Britain | May 28, 1958 |